INVENTORS
RAYMOND E. WEBER &
KENNETH J. ZWOBODA

BY S. A. Giavatana
ATTORNEY

INVENTORS
RAYMOND E. WEBER &
KENNETH J. ZWOBODA

ATTORNEY

United States Patent Office 3,541,839
Patented Nov. 24, 1970

3,541,839
FLUIDIC POSITION SENSOR
Raymond E. Weber, Jersey City, and Kenneth J. Zwoboda, Saddle Brook, N.J., assignors to Singer-General Precision, Inc., Little Falls, N.J., a corporation of Delaware
Filed July 15, 1968, Ser. No. 744,873
Int. Cl. F15c 4/00; G01b 13/00
U.S. Cl. 73—37           9 Claims

ABSTRACT OF THE DISCLOSURE

A position sensor having at least one sensing member disposed adjacent the workpiece, along with means to distribute fluid through the sensing member. The pressure of the fluid in the sensing member is proportional to the relative position of the sensing member and the workpiece, and means are provided to detect this pressure and provide an output signal.

BACKGROUND OF THE INVENTION

The present invention relates to an apparatus for sensing movement of a workpiece and, more particularly, to such an apparatus which utilizes a fluid operated sensing means.

There are many applications, such as an industrial machining and the like, where a fixed position must be maintained between two objects. For example, during the high speed drilling of a workpiece, it is imperative that the respective axes of the drilling machine and the workpiece be maintained coincidental throughout the entire drilling operation. There have been various proposals to achieve and maintain this coincidental positioning, but heretofore these proposals have involved devices which are relatively inaccurate and unreliable.

SUMMARY OF THE INVENTION

It is therefore an object of the present invention to provide an apparatus for sensing movement of at least one workpiece away from a predetermined position, with a high degree of precision and reliability.

Briefly summarized, the apparatus of the present invention includes at least one sensing member which has an outlet orifice positioned immediately adjacent a workpiece so that the latter resists the flow of fluid through the orifice. Means are provided to detect the pressure of the fluid in the sensing member to provide an output which is proportional to the relative position of the sensing member with respect to the workpiece.

BRIEF DESCRIPTION OF THE DRAWINGS

Reference is now made to the accompanying drawings for a better understanding of the nature and objects of the fluidic position sensor of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
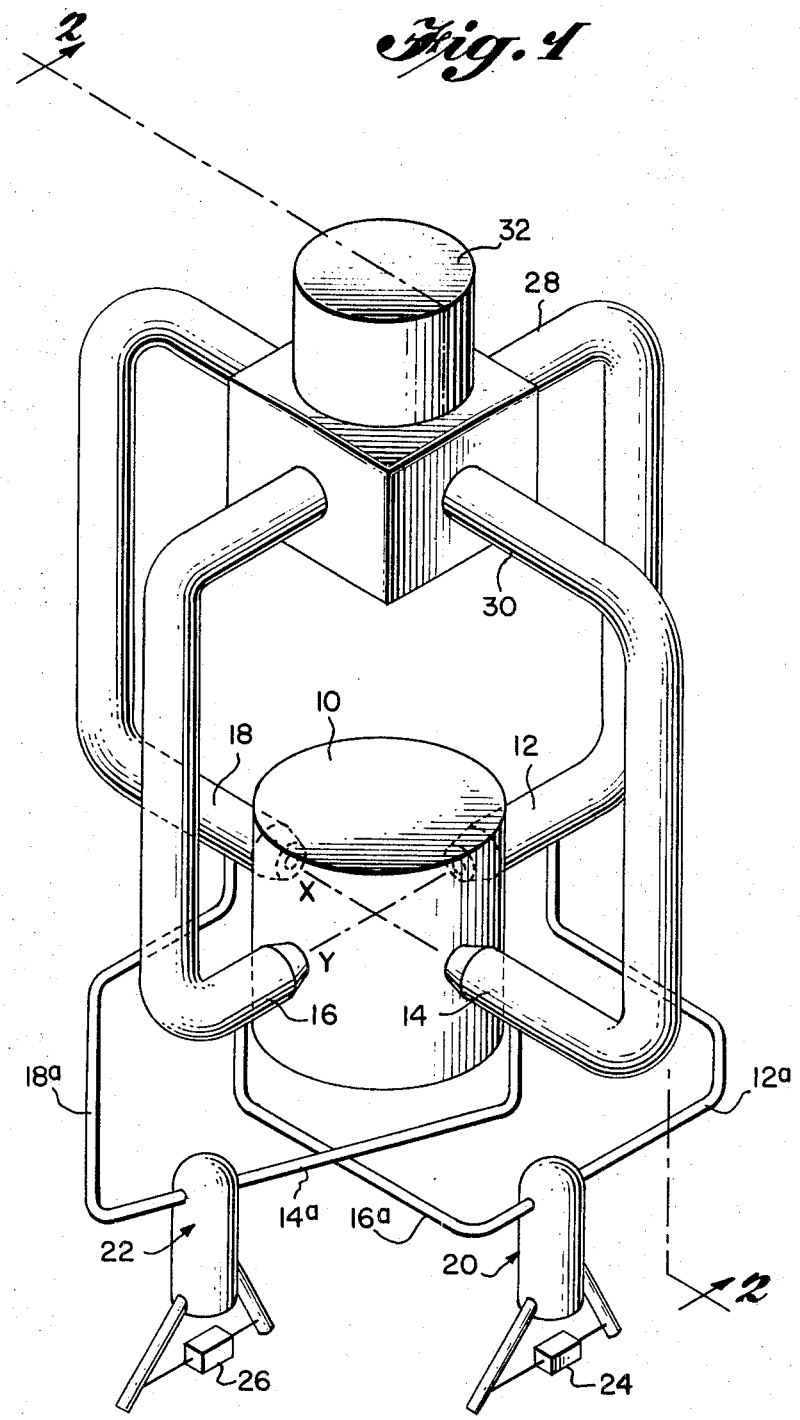
FIG. 1 is a perspective view, partially diagrammatic, showing the apparatus of the present invention.

Referring to FIG. 1, the apparatus of the present invention is shown positioned to sense any deviation of a cylindrical member 10 from the position shown, it being immaterial whether the member 10 is stationary or rotary.

Specifically, a plurality of sensing members 12, 14, 16 and 18 are disposed in equally spaced intervals around the circumference of the member 10, it being understood that any number of these sensing members may be provided within the limitations set herein. Pressure lines 12a, 14a, 16a and 18a extend from the sensing members 12, 14, 16 and 18 respectively, with pressure lines 12a and 16a terminating in a fluidic amplifier 20 and pressure lines 14a and 18a terminating in a fluidic amplifier 22. Transducers 24 and 26 are disposed across the output "legs" of the amplifiers 20 and 22, respectively, to convert the fluidic output thereof into an electrical or mechanical signal.

A manifold 28 is provided which connects a source of fluid 32 with the ends of the sensing members 12 and 16, and a similar manifold 30 connects the source of fluid to the sensing members 14 and 18.

Figure 2:
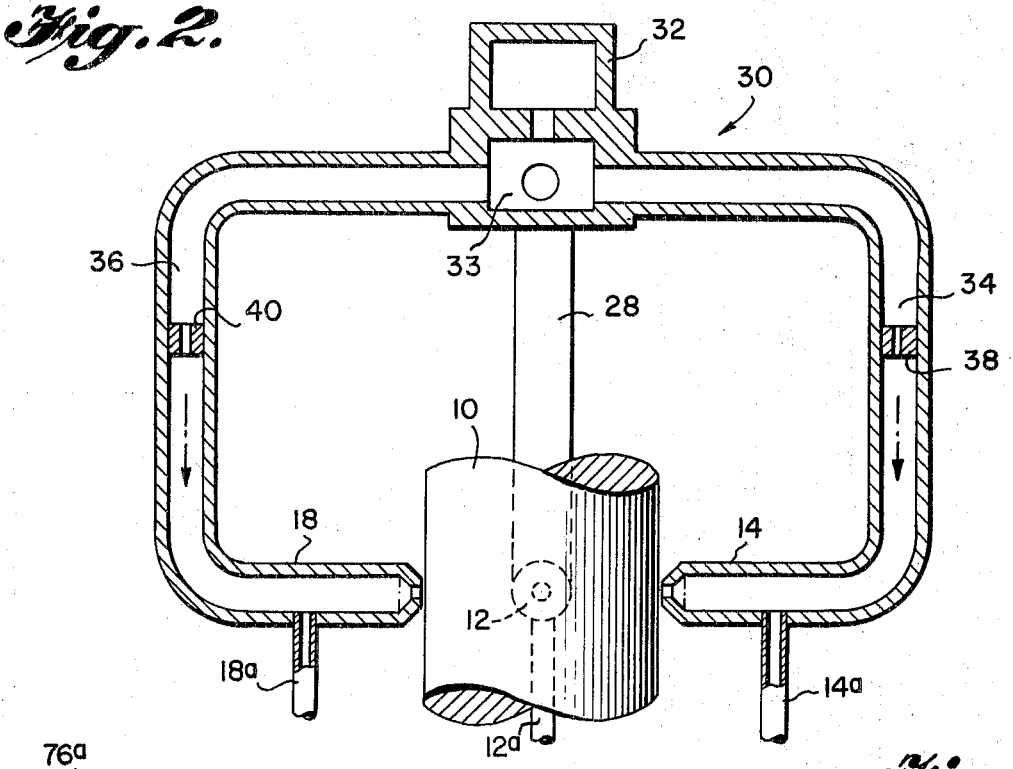
FIG. 2 is a sectional view taken along lines 2—2 of FIG. 1.

The details of the manifold 30 and the sensing members 14 and 18 are shown better with reference to FIG. 2, it being understood that the manifold 28 and the sensing members 12 and 16 are similarly constructed. Specifically, manifold 30 is substantially U-shaped and has an enlarged cavity 33 which registers with the fluid source 32, and with a pair of parallel fluid flow passages 34 and 36 which provide a fluid flow into the sensing members 14 and 18, respectively. Restrictions 38 and 40 are provided in each of the flow passages 34 and 36, respectively, to insure a constant flow of fluid into the sensing members 14 and 18.

The sensing members 14 and 18 are hollow and are tapered at one end to form a pair of outlet orifices which are disposed immediately adjacent the peripheral portion of the member 10 so that the latter provides a resistance to the flow of fluid through the sensing members and their orifices. The pressure lines 14a and 18a of the sensing members 14 and 18, respectively, are disposed upstream of their respective orifices, as shown.

In operation, the sensing members are positioned around the member 10, and fluid at constant flow is passed into the sensing members 12, 14, 16 and 18 from the manifolds 28 and 30, which fluid then passes through the orifices associated with the sensing members. The initial positioning of the sensing members with respect to the member 10 is such that the pressures in the pressure lines 12a and 16a are equal and the pressures in the pressure lines 14a and 18a are equal. Upon movement of the member 10 in any direction from this null position, such as in the x direction as shown in FIG. 1 towards the sensing member 18, the upstream pressure from the orifice associated with the sensing member 18 will increase, while the upstream pressure of the diametrically opposite orifice of the sensing member 14 will decrease by the same amount. Thus a differential pressure will exist in the pressure lines 18a and 14a, respectively, which provides an input to the fluidic amplifier 22, which is amplified and converted to mechanical or electrical energy by the transducer 26. For example, the transducer can be connected to a meter, or the like, for providing a reading of the displacement of the member 10.

It is apparent that the displacement of the member 10 from its null position will more than likely be in a direction having both an $x$ and a $y$ component, in which case the upstream pressures of each of the sensing members 12, 14, 16 and 18 will vary accordingly. Therefore, the transducer 26 will provide an output proportional to the displacement of the member 10 in the $x$ direction, and the transducer 24 will provide an output proportional to the displacement in the $y$ direction. By combining these $x$ and $y$ outputs in a well known manner a useful signal may be derived indicating not only the magnitude of the movement of the workpiece, but its exact sense of direction as well.

Figure 3:
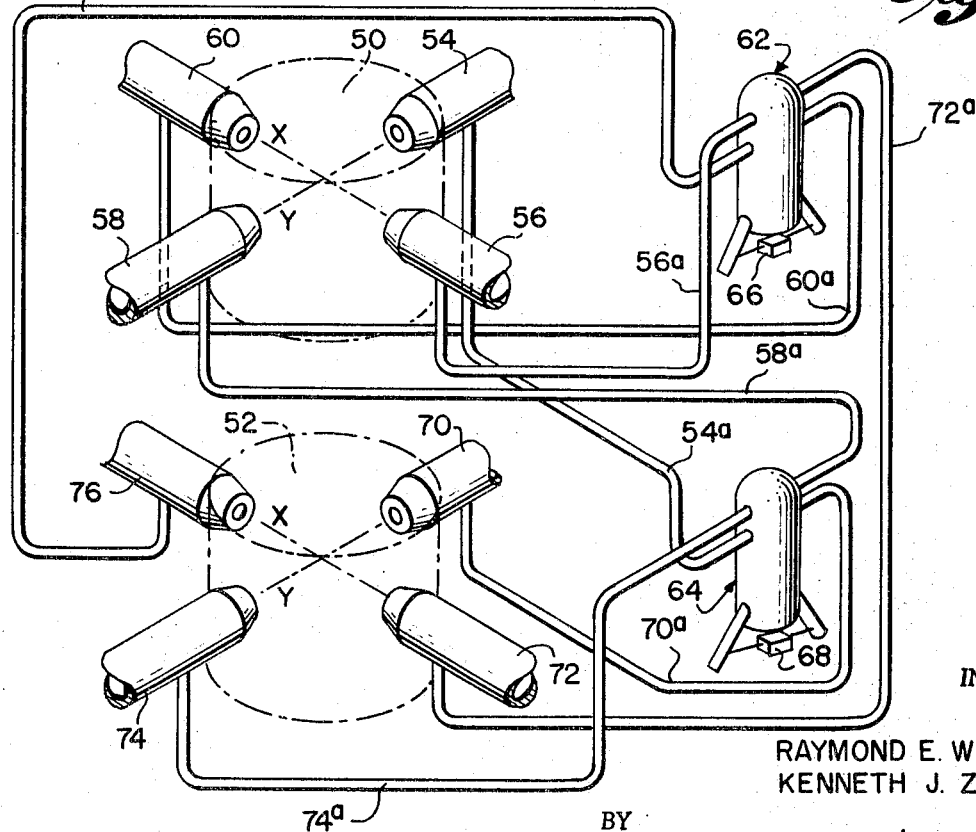
FIG. 3 is a view similar to FIG. 1 but showing an alternative embodiment of the present invention.

The embodiment of FIG. 3 is designed to provide a detection of any relative displacement between two members, such as a drilling tool, or the like, and the workpiece to be drilled, these members being shown by the reference numerals 50 and 52. According to this embodiment, a plurality of sensing members 54, 56, 58 and 60 are provided at equally spaced intervals around the circumference of the member 50, and have pressure lines 54a, 56a, 58a and 60a, respectively, extending therefrom. Likewise, the sensing members 70, 72, 74 and 76 are provided at equally spaced intervals about the outer circumference of the member 52 and have pressure lines 70a, 72a, 74a and 76a extending therefrom. In the interest of brevity, a fluid pressure source and distributing means has been omitted from FIG. 3, it being understood that they are similar to those described in connection with the embodiment of FIGS. 1 and 2.

An amplifier 62 is provided into which the pressure lines 56a and 60a extend to provide an input in response to any displacement of the member 50 in the x direction. The pressure lines 72a and 76a also extend into the amplifier 62 to provide an input in response to any displacement of the member 52 in the x direction. Likewise, an amplifier 64 is operatively connected to the pressure lines 54a and 58a to provide amplification of a signal in response to any displacement of the member 50 in the y direction; in addition to being operatively connected to the pressure lines 70a and 74a to provide amplification of a signal in response to any displacement of the member 52 in the y direction.

Assuming a displacement of the cylindrical member 52 in the y direction toward the sensing member 70, for example, the pressure in the pressure line 70a will increase in proportion to the added resistance to the flow of fluid through the sensing member 70. Likewise, a corresponding decrease in the pressure in the pressure line 74a will occur due to the decrease in resistance of the workpiece to the fluid flow through the sensing member 74. This differential pressure change will be amplified by the amplifier 64, which provides an output which is detected by the transducer 68 and converted into an electrical or mechanical signal to indicate the displacement of the member 52 with respect to the member 50.

It is emphasized that the embodiment of FIG. 3 will only detect the displacement of the members 50 and 52 relative to each other and will not register equal displacements of the members 50 and 52 together in the same direction.

The fluidic amplifiers discussed in connection with both of the above embodiments may be of any known type, such as those which provide a jet fluid flow across a path, with the input signals causing a deflection of this jet fluid into one of the two "legs" of the amplifier.

Also, the members to be sensed do not necessarily have to be cylindrical, but may be of any shape, and the number of sensing members associated with the workpiece can be varied in accordance with the particular requirements.

It is thus seen that the position sensor of the present invention provides a relatively simple, yet accurate, means of detecting displacement of a single workpiece or of two workpieces relative to each other.

Of course, other variations of the specific construction and arrangement of the position sensor disclosed above can be made by those skilled in the art without departing from the invention as defined in the appended claims.

We claim:
1. An apparatus for sensing relative movement between two workpieces comprising:
at least two sensing members each having an outlet orifice, means to distribute fluid through each said sensing member and its corresponding orifice, each of said sensing members being positioned immediately adjacent one of said workpieces respectively so that each workpiece resists the flow of fluid through each of said orifices respectively, and detecting means responsive to the pressure of fluid in each of said respective sensing members upstream of said corresponding orifices to provide an output proportional to the relative movement between the workpieces.

2. The apparatus of claim 1 wherein said means to distribute fluid comprises a manifold connecting each of said sensing members to a supply of pressurized fluid, said manifold containing means to distribute said fluid to said sensing members at constant flow.

3. The apparatus of claim 1 wherein said detecting means includes means to provide at least one electrical output signal.

4. The apparatus of claim 1 wherein two pairs of sensing members are provided for each of said workpieces, the sensing members of each pair being located 180° apart.

5. The apparatus of claim 4 wherein said detecting means includes two fluidic amplifiers, each associated with one pair of sensing members of each of said workpieces.

6. An apparatus for sensing movement of at least one workpiece, said apparatus comprising at least two sensing members each having an outlet orifice, means to distribute fluid through each said sensing member and its corresponding orifice, said distributing means including a supply of pressurized fluid connected to a manifold, said manifold having a pair of outlet ports connected to each of said sensing members for supplying a constant flow of pressurized fluid thereto, said sensing members being positioned immediately adjacent said workpiece and being positioned in quadrature with respect to each other so that said workpiece resists the flow of fluid through said quadrature related orifices, and detecting means responsive to the pressure of fluid in each of said sensing members upstream of said corresponding orifices to provide a pair of output signals proportional to the relative component of movement of said workpiece relative to said orifices along a pair of mutually perpendicular axes respectively.

7. The apparatus of claim 6 wherein two separate pairs of sensing members are provided, the sensing members of each pair being disposed on diametrically opposite sides of said workpiece respectively, each separate pair being positioned in quadrature with respect to the other, and said manifold includes two pairs of output ports, each port being connected to each of said sensing members respectively, whereby said detecting means senses the differential in pressure in each said pair of diametrically opposed orifices produced by movement of said workpiece as hereinaforesaid.

8. The apparatus of claim 6 wherein said detecting means comprises a fluidic amplifier responsive to the pressure variations in each said sensing member respectively.

9. The apparatus of claim 6 in which said detecting means includes transducer means to produce an electrical output signal indicative of the component of movement of said workpiece along each of said respective axes.

References Cited

UNITED STATES PATENTS

| | | |
|---|---|---|
| 2,660,886 | 12/1953 | Milmore. |
| 2,712,181 | 7/1955 | Mahlmeister 73—37.5 XR |
| 2,731,825 | 1/1956 | Le Van 73—37.5 |
| 2,792,569 | 5/1957 | Byrkett 73—37.5 XR |
| 2,845,791 | 8/1958 | Loxham et al. 73—37.5 |
| 3,232,095 | 2/1966 | Symnoski et al. 137—81.5 XR |
| 3,363,453 | 1/1968 | Erickson 73—388 XR |
| 3,426,583 | 2/1969 | McArthur et al. 137—81.5 XR |
| 3,433,238 | 3/1969 | Nightingale 137—81.5 |
| 3,438,384 | 4/1969 | Hurvitz 137—81.5 |

SAMUEL SCOTT, Primary Examiner

U.S. Cl. X.R.

137—81.5